Feb. 2, 1960 P. GREGER 2,923,216
PHOTOGRAPHIC CAMERA
Filed Jan. 25, 1956 4 Sheets-Sheet 2
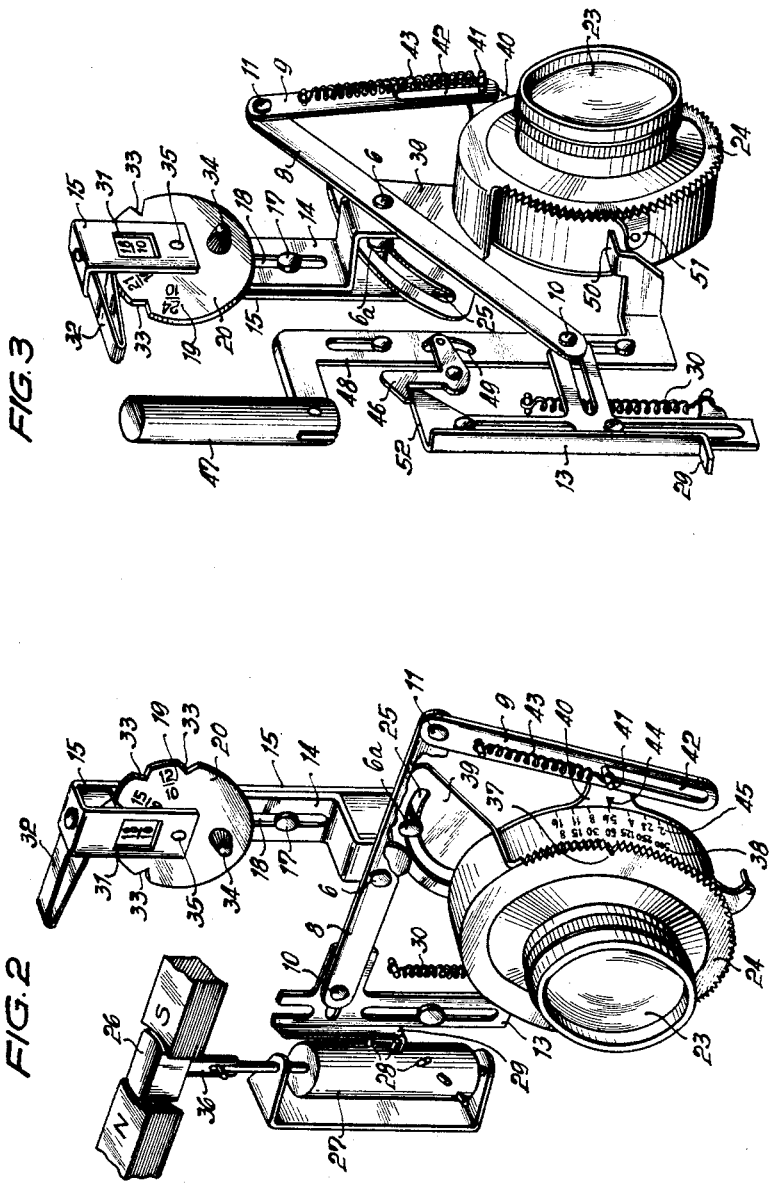
INVENTOR
PAUL GREGER
Mock + Blum
ATTORNEYS Feb. 2, 1960    P. GREGER    2,923,216
PHOTOGRAPHIC CAMERA
Filed Jan. 25, 1956    4 Sheets-Sheet 3
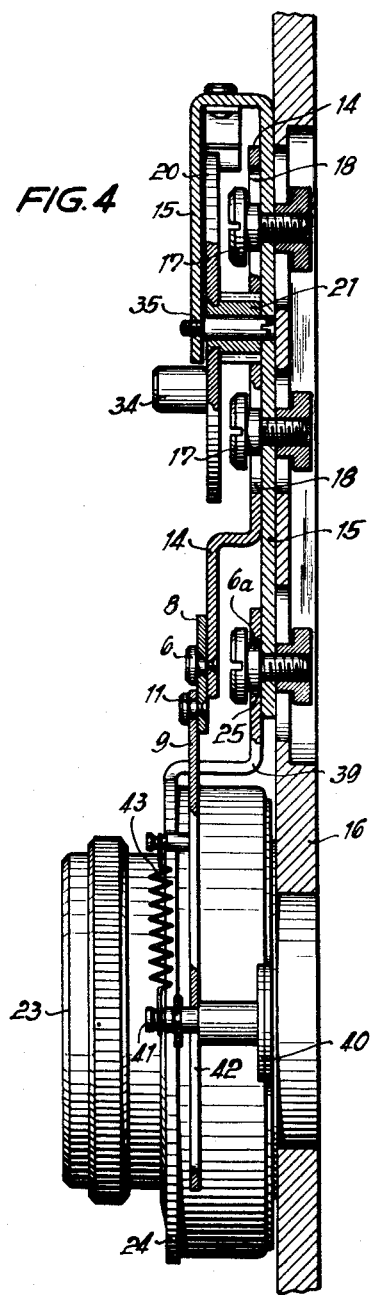
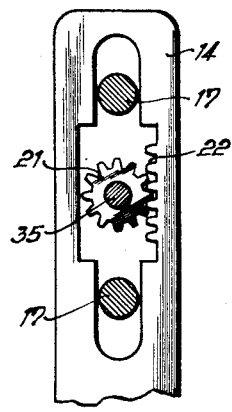
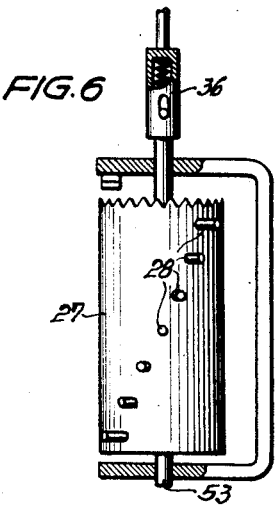
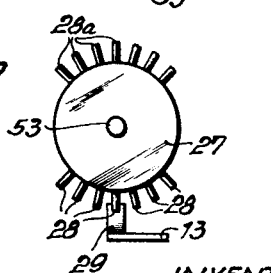
INVENTOR
PAUL GREGER
Mock & Blum
ATTORNEYS Feb. 2, 1960 P. GREGER 2,923,216
PHOTOGRAPHIC CAMERA
Filed Jan. 25, 1956 4 Sheets-Sheet 4

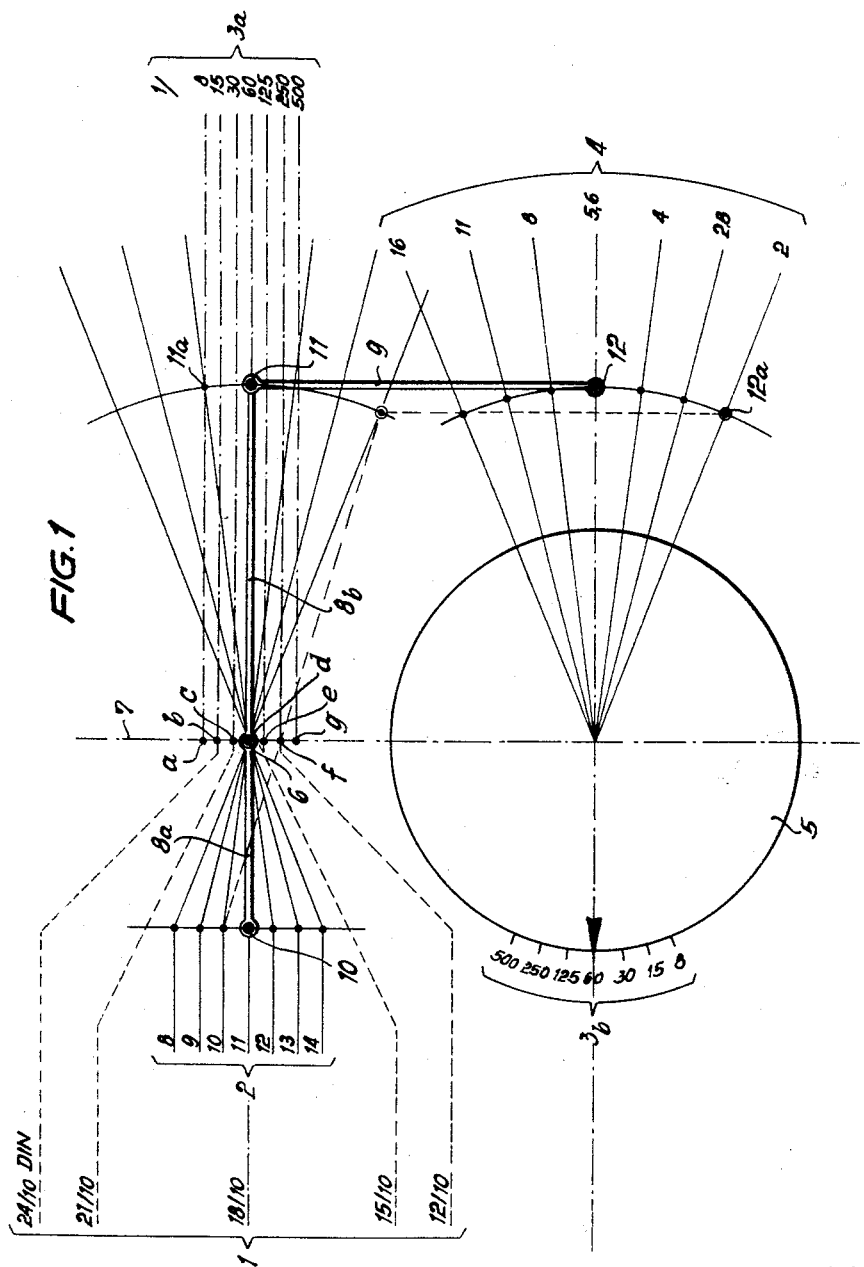

INVENTOR
PAUL GREGER

Mock & Blum
ATTORNEYS

United States Patent Office 2,923,216
Patented Feb. 2, 1960

2,923,216
PHOTOGRAPHIC CAMERA

Paul Greger, Braunschweig, Germany, assignor to Voigtlander Aktiengesellschaft, Braunschweig, Germany, a corporation of Germany Application January 25, 1956, Serial No. 561,276

Claims priority, application Germany January 29, 1955

5 Claims. (Cl. 95—10)

This invention relates to photographic cameras provided with devices for coupling the objective diaphragm, exposure time and sensitivity of the film.

In photographic cameras, in which the exposure time and the diaphragm have to be adjusted by hand independently from each other with consideration of the light sensitivity of the negative material used, defective exposures of the film or the like may occur owing to inexperience of or error by the operator of the camera.

In order to secure satisfactory pictures, it has become conventional in the construction of cameras to couple the adjusting steps, which are necessary for obtaining correct exposure, with each other. Numerous suggestions have become known in this connection in the art. The realization of these suggestions resulted, among others, in shutter devices provided with light values which are in quite general use in photography at present. In these types of shutters the light values can be read from corresponding scales of modern electric exposure meters and adjusted on the camera shutter.

Moreover, it has also been suggested to couple with each other not only the diaphragm and shutter time, but also the sensitivity of the film and, if desired, the filter factor and the distance factor which latter is essential in certain cases of picture taking with artificial light.

It has been likewise known to use a predetermined diaphragm or shutter time and automatically adjust the coordinated correct value of the other exposure factor, i.e. the shutter time or the diaphragm, in dependence from the pointer deflection of an electric exposure meter. These automatic devices operate in such a manner that either the current of the photocell directly effects adjustment or the pointer deflection is mechanically scanned and then transmitted to the member to be adjusted.

The devices of this type described in the art operate in general with differential gears. The structure of such gears is relatively complicated. They are composed of a plurality of cog wheels, a combination of cog wheels and racks and the like. These individual parts must be exactly fitted to each other in order to obtain satisfactory adjustment. Their manufacture is, therefore, expensive. The accuracy of measurements is nevertheless not entirely satisfactory, because the accuracy is reduced if the number of individual parts used for transmission increases.

The main object of the present invention is to eliminate the before mentioned difficulties and defects. It is therefore an object of the invention to provide a photographic camera in which the light value can be adjusted in dependence on the measurement of an electric exposure meter and in which coupling of the adjusting elements for diaphragm, exposure time and film sensitivity is effected by means of simple devices which are safe in operation and can be easily manufactured.

According to the present invention, this object is attained by coupling with each other the factors influencing exposure, i.e. the adjusting means for diaphragm, exposure time and film sensitivity, by means of a lever system which has a displaceable pivot for the consideration of at least one of said values influencing the exposure.

The appended drawings illustrate by way of example and without limitation some embodiments of and best ways for carrying out the invention.

In the drawings Fig. 1 illustrates the principle of the device according to the present invention.

Fig. 2 illustrates the essential parts of a device according to the invention in perspective view.

Fig. 3 is a perspective illustration of a device, similar to that shown in Fig. 2, but showing by way of example a shutter release; the cylinder controlled by the exposure meter is omitted in this figure.

Figure 8:
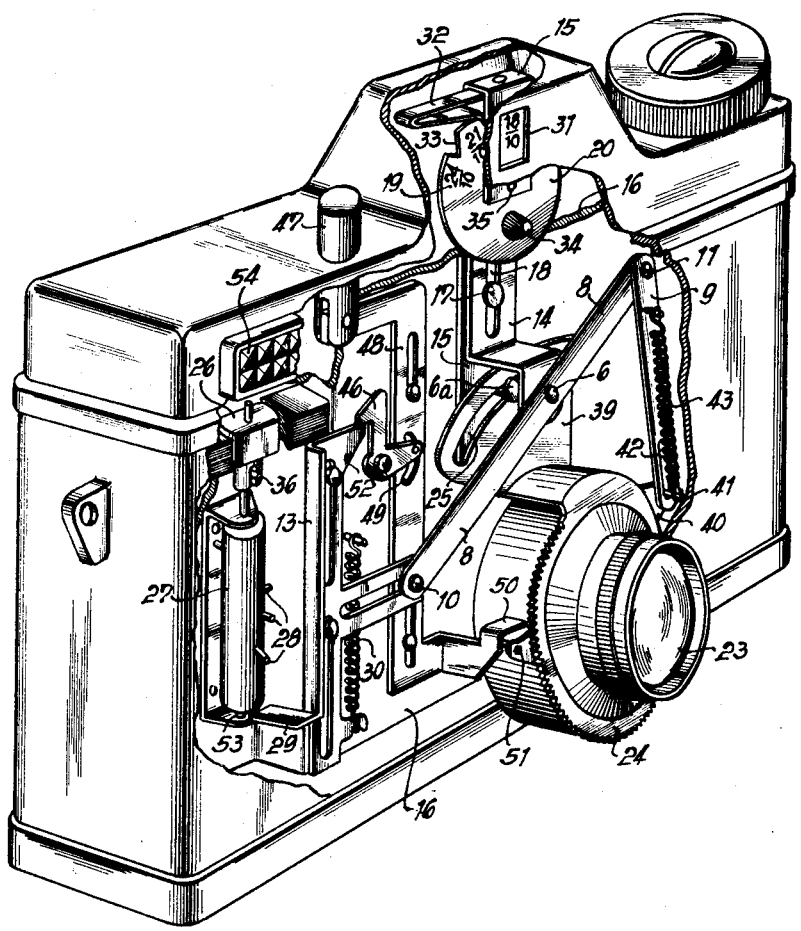

Structural details of an embodiment of the invention are shown in side view, partially in section in Fig. 4.

Fig. 5 illustrates conversion of the rotary movement for adjustment of the film sensitivity into a straight line motion of a slide.

Figs. 6 and 7 illustrate the cam cylinder connected with the electrical measuring system, in side view and in top view.

Fig. 8 illustrates a device embodying the present invention within a photographic camera, in perspective view.

Identical elements are denoted in all figures by identical reference numerals.

Parts which are not essential for the disclosure and understanding of the invention have been omitted in the drawings.

Referring now to the drawings in detail, in Fig. 1 five scales are provided and connected with each other, either by continuous or broken lines. Scale 1 includes five grades of film sensitivity; scale 2 includes seven light values; scale 3a includes seven time values for the objective shutter. To scale 3a a scale 3b corresponds which is applied, opposite to scale 4 containing the seven diaphragm numbers, to the circle 5, which may illustrate e.g. the shutter casing. In carrying out the invention, the extent of the scale ranges is immaterial. They can be smaller as well as larger than in the example here shown. The mode of operation would be likewise the same if the scales would not be subdivided according to stepwise adjustments and if adjustment of the values influencing the exposure for obtaining correct exposure would take place continuously. Fig. 1 also shows a two-armed lever having lever arms 8a and 8b. To the end 11 of one of said lever arms, a straight ledge 9 is linked. The center of rotation 6 of the lever is displaceable along the dash and dot line 7. The device here shown is dimensioned in such a manner that for the exposure of the negative material equivalent adjusting steps of the various adjusting organs, such as diaphragm, exposure time, film sensitivity, etc., are brought about by equal control steps of their adjusting means coupled with each other.

By means of such a simple lever system, the most varied values affecting correct exposure, can be coupled with each other. In order to keep the following description as clear and easily understandable as possible, I limit the following description by way of example to control movements which take place in the scheme shown in the plane of the sheet of the drawing. The number of the members to be coupled could be increased without difficulty by permitting in addition to tilting movement of the lever arrangement, also rotary motions in other planes. To the control steps of the latter, which would have to be defined likewise exactly, if desired, over additional intermediate members, predetermined adjustment paths of further affecting values, such as for example filter factor, distance factor in the case of artificial light and others, would have to be coordinated.

Under the conditions shown in Fig. 1, the lever mechanics is adjusted to the film sensitivity 18/10 DIN and the light value 11. The exposure time is set to 1/60 second and the diaphragm to 5.6. If, at unchanged exposure time and unchanged sensitivity of the negative, the light value changes for example from 11 to 12, then point 11 shifts to point 11a, whereby over ledge 9 the diaphragm is adjusted from 5.6 to 8. The same adjustment of the diaphragm would occur in a similar manner at unchanged sensitivity value and light value if the shutter time ring is turned from 1/60 to 1/30 second. Thereby the lever point 10 would remain at light value 11, the point of rotation 6 would move by one step along the line 7 upward, i. e., from d to c. Point 11 would move to position 11a and would lift ledge end 12 from diaphragm value 5.6 to diaphragm value 8.

Assuming, as another example, an exposure time of 1/25 second and a sensitivity value of the film inserted in the camera of only 15/10 DIN, then taking a picture at a light value of 10, the objective diaphragm will be adjusted to the value 2. This happens because adjustment of the time from 1/60 to 1/25 second means a step of the pivot 6 from point d to point e; change of the film sensitivity from 18/10 DIN to 15/10 DIN means a further step of pivot 6 downward along the line 7, i. e. to the point f; furthermore, lever point 10 is displaced from light value 11 to the light value 10, so that finally lever 8a, 8b will occupy the position, shown in dotted line, the end of ledge 12 takes three steps to the point 12a and adjusts the diaphragm value 2.

The lever system which couples the adjusting organs with each other for consideration of the values affecting the exposure, is preferably provided with a two-armed lever, to the ends of which ledge-shaped transmission members are linked as connections to the adjusting organs. This lever is, according to the invention, tiltably or rotatably fastened to a slide which can be displaced by itself, or together with a second slide, relative to the camera casing. Both possibilities of displacement for the lever pivot can be provided in courses which are equidirectional or may form any desired angle with each other. Equidirectional displacement is preferred. This is attained in a simple manner by arranging in parallel position, one after the other, two slides which are displaceably connected with each other by means of slot guides. Both slides can be displaced also relative to the camera casing and one of the slides carries the point of rotation of the lever. To each slide an affecting value can be coordinated. The question which kind of values should be selected in each case, i. e. diaphragm, shutter time, light value, film sensitivity, filter factor or others, depends on the circumstances of each individual case. According to a preferred embodiment of the invention, in which adjustment of the diaphragm takes place automatically, it is contemplated to displace one slide in dependence on the film sensitivity and the other in dependence on the adjustment of a predetermined exposure time. Both displacements change the position of the lever pivot of the coupling device, which is fastened to the slide system.

Displacement of the slides can be effected by a great variation of means in conventional manner. In view of easy manufacture and maximum safety of operation, it is contemplated according to the invention to use for the adjustment of the film sensitivity slide a manually operated screen disc, to the axis of rotation of which a pinion is fastened. The pinion engages a corresponding toothing of the slide and causes displacement of the latter upon turning of the screen disc from one grade of the film sensitivity to another by corresponding distances which are equal to each other. Instead of the pinion other displacing means, e. g. cam guides or the like, can be used. As a checking means, a window is provided, in which the sensitivity number of the film material used is indicated in each case. Transmission of the exposure time adjustment to the coupling lever system takes place by means of a pin guide of the second slide in a cam-shaped recess which is located in an extension piece of the time adjustment ring and affects the position of the lever pivot in accordance with the selected exposure time.

The same effect can be, of course, also obtained by providing the time adjusting ring with a pin which slides in a corresponding cam recess of the slide. Instead of the exposure time, by the use of the same means and in the same manner, the adjustment of the diaphragm can be likewise transmitted to the lever system, if such adjustment can be freely selected.

Transmission of the light value indicated by the exposure meter, to the coupling lever system takes place fully automatically according to the invention. Any of the devices known for such automatic transmission of pointer deflections to the adjusting organs of the objective diaphragm or exposure time can be used. However, in order to use also in this connection only few and particularly simple means, it is further contemplated according to the present invention, to couple the rotary system of the electric exposure meter with a rotatably arranged cam shaft which is designed in such a manner that its angular turns, which correspond to the light values measured in each case, can be scanned by a contact member on its cams, pins, flaps, teeth or the like. The scanning in such a device can take place without previous clamping or other arresting steps in the measuring instrument, of the pointer or its cam shaft. As a simple scanning member, for example a ledge, rod or the like, which is displaceable by spring effect, is provided with a suitable stop member. This ledge, rod or the like, affects the position of one lever arm, to which it may be, for example, linked. The ledge or the like is displaced, for example by operation of the release mechanism of the camera under spring effect or the like along the cam shaft, to such an extent until its stop abuts against one of the cams, i.e. against that cam which corresponds to the measured light value in the respective case. Thereby simultaneously over the other lever arm and, for example, a transmission member linked thereto, either the exposure time or the diaphragm is correctly adjusted.

In the device shown, first the sensitivity of the negative material used is introduced into the coupling device. (See Fig. 2.) This is done by turning the disc 20 by means of knob 34. The disc 20 carries a film sensitivity scale 19. In front of the disc 20 a window 31 is provided. The disc 20 is turned until the sensitivity value corresponding to the picture taking negative material occurs in window 31. In the example shown in the drawing, this value amounts to 18/10 DIN. Every adjustment is protected from inadvertent shifting, by locking spring 32 in one of the notches 33. Behind the disc 20, on the axis of rotation 35 thereof, a pinion 21 is fixedly arranged (see Figs. 4 and 5). This pinion 21 engages teeth 22 of slide 14 and causes displacement of the latter upon turning disc 20. Thereby the slide 14 is displaced in accordance with the film sensitivity adjusted in window 31. Together with slide 14, pivot 6 of lever 8, which is arranged on the slide, is also displaced (see Figs. 2, 3, and 8). By this displacement of pivot 6, the film sensitivity value is introduced into the coupling device. Point 6 in Fig. 1 is fixed to the correct value along line 7 (see Fig. 1).

In the embodiment shown in the drawing it is assumed that the shutter time can be freely selected and adjusted by hand. This adjustment too must be introduced into the coupling device in order to obtain ultimately correct exposure data. The exposure time is selected by turning time-adjusting ring 24. Adjustment of the exposure time can be read over mark 37 on scale 38. Adjusting ring 24 is provided with a bent flap 39 and this, in turn, is provided with a cam-shaped recess 25, in which a pin 6a is guided. This pin 6a is fixedly connected with slide 15 which is displaceably guided on partition 16 of the camera (see Figs. 4 and 8). If time-adjusting ring 24 is turned, slide 15 will be thus displaced according to the pitch of recess 25 relative to camera partition 16. Together with slide 15, slide 14 which is connected to slide 15 over pinion 21 and teeth 22, will be displaced in conformity with the adjustment of the shutter time. Thus, lever pivot 6 is subjected to its second displacement coordinated with the time adjustment, along line 7 in Fig. 1.

Correct adjustment of the diaphragm, based on the adjusted values of film sensitivity and shutter time under the light conditions prevailing in the space of picture taking in the respective case, is fully automatically effected by the electric exposure meter 54 (see Fig. 8).

The electromagnetic rotary system 26 is connected with a rotatably arranged cam shaft 27 over a coupling 36 which prevents eventually occurring knocks from reaching the measuring instrument. The cams, which are shown in Figs. 2 and 8 as pins 28, are arranged along a helical surface line of member 27. Each of the pins 28 corresponds to a specific diaphragm number. The cylinder 27 turns by angles, the size of which is proportional to the light value determined by the exposure meter. In this manner, each time a pin 28 reaches the contact range of stop member 29 of adjusting ledge 13 which, after corresponding release, is moved by a spring 30 along member 27 until its stop 29 abuts against one of the pins 28. The ledge 13 is linked to an end portion of one of the arms of lever 8 which is capable of swinging about pivot 6. The end of the other lever arm is connected over rod 9 with an extension of diaphragm adjusting ring 40. If now spring 30 pulls contact member 29 in abutment against one of the pins 28, then lever 8, the pivot 6 of which has already been displaced in conformity with the introduced values of film sensitivity and exposure time (in the manner described above), is caused to swing by a predetermined amount and rod 9 transmits this adjustment to the diaphragm adjusting ring 40. In this manner time and diaphragm are adjusted for correctly taking pictures, in dependence on the film sensitivity and the measured light value.

Adjusting pin 41, which is fastened to diaphragm ring 40, is guided in an elongated hole 42 of transmission rod 9, whereby a tension spring 43 tends to keep pin 41 in its terminal position in oblong hole 42. This hole 42 is provided in order to take up swinging paths of lever 8, which, for example, at the initial position shown in Fig. 3, go beyond the turning limits of adjusting ring 40.

For checking purposes, diaphragm ring 40 is provided with a mark 44, by means of which the diaphragm adjusting values can be read on scale 45.

The arrangement of pins 28 on a cylinder 27 is particularly shown in Figs. 6 and 7. The number of the pins 28 can be freely selected and depends on the number of the available diaphragm steps. The pins denoted 28a in Fig. 7 serve merely as balance weights in order to relieve shaft 53. Such relief can be, of course, obtained also by other conventional means. The pitch of the helical line, along which the pins are arranged, depends on the angle of rotation of the indicating range of measuring system 26. Instead of a cylinder provided with pins, as shown in the drawing, scanning of the measured light value can be effected also by other means such as cam shafts, metal strips bent into corresponding grades, metal tubes or the like.

In Fig. 3, coupling lever 8 and contact ledge 13 are shown in their initial position in which they are held by pawl 46. Release of the measuring and coupling device as well as the objective shutter take place in the embodiment shown by operation of a release button 47. If this release button 47 moves downward, it takes along rail 48. By means of a bolt guided in oblong hole 49, latch 46 is pulled by ledge 13 from nose 52 of ledge 13 so that the automatic scanning of light value and adjustment of diaphragm can take place. Upon further sliding down of rail 48, angle extension 50 takes along release lever 51 and releases the camera shutter.

It will be understood from the above that this invention is not limited to the specific constructions, elements, designs and other details specifically described above and illustrated in the drawings and can be carried out with various modifications without departing from the scope of the invention as defined in the appended claims.

What is claimed is:

1. A photographic camera comprising members for adjustment of film sensitivity, exposure time and diaphragm, respectively, for obtaining correct adjustment of exposure value; means for coupling said adjusting members over a lever system including a double-armed lever and having a pivot displaceably arranged for consideration of at least one of said values affecting the exposure; a first slide and a second slide which are arranged in parallel position one behind the other and are connected with each other by a slot guide; one of said slides carrying said pivot and being displaceable over the member for adjustment of film sensitivity and the second slide being displaceable in conformity with a second exposure factor in order to subject the pivot of the double-armed lever to a second displacement in dependence on said second exposure factor; a shutter time adjusting ring which is rotatable about the optical axis of the picture-taking objective and is provided with a flap having a cam-shaped recess, a pin fastened to said second slide being guided in said recess in order to transmit the shutter time adjustment to the pivot of the double-armed lever.

2. A photographic camera as claimed in claim 1, in which the member for adjustment of film sensitivity consists of a rotatable disc which is provided with a scale and is connected with a pinion which transmits the adjustment path of the disc to the first slide, over a rack connected with the first slide to which the double-armed lever is pivotally connected.

3. A photographic camera as claimed in claim 2, comprising means scanning the measuring value of an electric exposure meter, for automatic control of the lever system.

4. A photographic camera as claimed in claim 3, in which a rotary system of the exposure meter is coupled with a rotatably arranged cam shaft and which comprises a contact member for scanning the angle of rotation of said shaft, which corresponds to the measured light value, by means of pins provided on said shaft.

5. A photographic camera as claimed in claim 4, comprising means for scanning the measured exposure value and transmitting it to the exposure organ to be adjusted upon actuation of the operating member for the objective shutter.

References Cited in the file of this patent

UNITED STATES PATENTS

| | | |
|---|---|---|
| 2,148,963 | Rauch | Feb. 28, 1939 |
| 2,418,370 | Simmon | Apr. 1, 1947 |